United States Patent [19]

Pauze

[11] 4,259,221
[45] Mar. 31, 1981

[54] WATER-SOLUBLE POLYAMIDEIMIDES

[75] Inventor: Denis R. Pauze, Scotia, N.Y.

[73] Assignee: General Electric Company, Schenectady, N.Y.

[21] Appl. No.: 929,367

[22] Filed: Jul. 31, 1978

Related U.S. Application Data

[63] Continuation of Ser. No. 753,653, Dec. 20, 1976, abandoned.

[51] Int. Cl.³ .......................... C08J 3/06; C08L 79/08
[52] U.S. Cl. ...................... 260/29.2 N; 260/29.2 TN; 525/424; 525/436
[58] Field of Search .................. 260/29.2 N, 29.2 TN; 525/436, 424

[56] References Cited

U.S. PATENT DOCUMENTS

| | | | |
|---|---|---|---|
| 3,260,691 | 7/1966 | Lavin et al. | 260/30.2 |
| 3,471,444 | 10/1969 | Sherer et al. | 260/30.2 |
| 3,518,230 | 6/1970 | Sheffer et al. | 260/30.2 |
| 3,737,478 | 6/1973 | Boldebuck | 260/29.2 N |
| 3,766,117 | 10/1973 | McQuade | 260/29.2 N |
| 3,804,793 | 4/1974 | McQuade | 260/29.2 N |
| 3,810,858 | 5/1974 | Boldebuck | 260/29.2 N |
| 3,817,926 | 6/1974 | Pauze et al. | 260/30.2 |
| 3,847,878 | 11/1974 | Hanson et al. | |
| 3,975,345 | 8/1976 | Fessler | 260/29.2 TN |
| 3,975,345 | 8/1976 | Fessler | 260/29.2 N |
| 4,008,195 | 2/1977 | Ishizuka et al. | 260/29.2 N |
| 4,014,832 | 3/1977 | Suzuki et al. | 260/29.2 N |
| 4,014,834 | 3/1977 | Concannon | 260/29.2 N |

FOREIGN PATENT DOCUMENTS 570858  7/1945  United Kingdom .

*Primary Examiner*—Allan Lieberman
*Attorney, Agent, or Firm*—Morgan, Finnegan, Pine, Foley & Lee

[57] ABSTRACT

Polyamideimide base coating compositions having water as a solvent constituent are provided. Amine containing material is added to the polyamideimide along with water or water and a relatively small amount of compatible organic solvent to provide a composition having good coating qualities and salutary electrical insulating and physical characteristics.

6 Claims, No Drawings

WATER-SOLUBLE POLYAMIDEIMIDES

This is a continuation of application Ser. No. 753,653, filed Dec. 20, 1976, now abandoned.

This invention relates to polyamideimide base coating compositions. More particularly, it relates to such coating compositions which have water as the sole or major solvent constituent.

Resinous coating compositions in the form of varnishes and enamels in which for ease of application the polymer is dissolved in compatible solvents are well known. Among the most useful coating compositions are those which are based on polyamideimides. Polyamideimide coating compositions form flexible and durable films and are particularly useful as wire enamels, varnishes, adhesives for laminates, paints and the like. Such polyamideimide base coating compositions are particularly noted for their long term high temperature capability of the order of 220° C. which, in addition to their other qualities, makes them particularly useful in electrical insulating applications such as for magnet wire enamels. This is as compared to the usual polyester and polyesterimide base coating compositions which do not have such highly continuous heat resistance. Since polyamideimides have heretofore been prepared using relatively expensive organic solvents, the economic use of amideimide coatings has been inhibited. It has been customary, for example, to use such polyamideimide compositions as overcoats over less expensive polyester or polyesterimide base coats. It would be most desirable and the high temperature characteristics of polyamideimide coating compositions would be more fully realized commercially were cheaper solvents made available. It is a primary object of this invention to provide polyamideimide coating compositions which contain relatively inexpensive solvent systems which are not only more economic but which do not product undesirable concentrations of pollutants when they evaporate during curing of the resin base.

As pointed out above, polyamideimide compositions are well known, being directed widely in the literature and in patents such as U.S. Pat. Nos. 2,421,021; 3,260,691; 3,471,444; 3,518,230; 3,817,926 and 3,847,878 as well as in the foreign patent literature as illustrated, for example, by British Pat. No. 570,858.

As exemplary of the preparation of polyamideimides, there can be reacted together a carboxylic anhydride and an organic primary amine to form an amideimide prepolymer, there being reacted with this prepolymer a polyisocyanate to produce a relatively high molecular weight block polymer which in solution affords the desirable film-forming and other characteristics inherent in polyamideimides.

Any of a number of carboxylic anhydrides can be used in making polyamideimides including but not limited to the following, among others, which will occur to those skilled in the art: trimellitic anhydride; 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone 3,3',4-tricarboxylic anhydride; diphenyl isopropylidene 3,3',4-tricarboxylic anhydride; 3,4,10-perylene tricarboxylic anhydride; 3,4-dicarboxyphenyl 3-carboxyphenyl ether anhydride; ethylene tricarboxylic anhydride; 1,2,5-naphthalene tricarboxylic anhydride, etc.

The tricarboxylic acid materials can be characterized by the following formula:

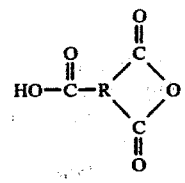

where R is a trivalent organic radical.

The polyamines useful in the above connection are well known and may be expressed by the formula $$X-R''(-NH_2)_n \qquad \text{II}$$

where R" is an organic radical and n is at least 2 and X is hydrogen, an amino group or organic group including those also containing at least one amino group.

The polyamines useful in the above connection can also be expressed by the formula $$R'''(-NH_2)_n \qquad \text{III}$$

where R''' is a member selected from the class consisting of organic radicals of at least two carbon atoms (both halogenated and unhalogenated) including but not limited to, e.g., hydrocarbon radicals of up to 40 carbon atoms, and groups consisting of at least two aryl residues attached to each other through the medium of a member selected from the class consisting of an alkylene radical of from 1 to 10 carbon atoms, —S—, —SO$_2$—,

and —O—, etc., and n is at least 2.

Among the specific useful amines, alone or in admixture, are the following:
p-xylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
H$_2$N(CH$_2$)$_3$O(CH$_2$)$_2$O(CH$_2$)$_3$NH$_2$
H$_2$N(CH$_2$)$_3$S(CH$_2$)$_3$NH$_2$
H$_2$N(CH$_2$)$_3$N(CH$_3$)(CH$_2$)$_3$NH$_2$
meta-phenylene diamine
para-phenylene diamine
4,4'-diamino-diphenyl propane
4,4'-diamino-diphenyl methane benzidine 4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
polymethylene polyaniline Any polyisocyanate, that is, any isocyanate having two or more isocyanate groups, whether blocked or unblocked, can be used in making polyamide imides. Blocked isocyanates using as the blocking constituent phenols or alcohols, among others, can be used and in general provide a higher molecular weight final material which is advantageous as, for example, in varnishes. On the other hand, the unblocked isocyanates provide more flexible final materials. At any rate, the blocking material must be evaporated off as much as possible and there is no advantage from the purely reaction point of view to using the blocked material except as stated above. Typical of the blocked polyisocyanates is Mondur S wherein mixtures of 2,4- and 2,6-tolylene diisocyanate are reacted with trimethylol propane and blocked by esterification with phenol in the proportions of three moles of isocyanate, one mole of trimethylol propane, and three moles of phenol. In Mondur SH the isocyanate groups of mixed 2,4- and 2,6-tolylene diisocyanate are blocked by esterification with cresol. Among the specific polyisocyanates which are useful alone or in admixture are the following:

tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate
4,6-dimethyl-1,3-xylylenediisocyanate
1,3-dimethyl-4,6-bis-(b-isocyanatoethyl)-benzene
3-(a-isocyanatoethyl)-phenylisocyanate
1-methyl-2,4-cyclohexylenediisocyanate
4,4'-biphenylenediisocyanate
3,3'-dimethyl-4,4'-biphenylenediisocyanate
3,3'-dimethoxy-4,4'-biphenylenediisocyanate
3,3'-diethoxy-4,4'-biphenylenediisocyanate
1,1-bis-(4-isocyanatophenyl)cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4''-triisocyanato-triphenylmethane
2,4,4'-triisocyanato-diphenylether
2,4,6-triisocyanato-1-methyl-3,5-diethylbenzene
o-tolidine-4,4'-diisocyanate
m-tolidine-4,4'-diisocyanate
benzophenone-4,4'-diisocyanate
biuret triisocyanates
polymethylenepolyphenylene isocyanate Generally speaking, a slight molar excess of carboxylic acid anhydride and organic polyamine is heated to about 200° C. to 245° C. in an inert atmosphere and solvent as above, driving off the water formed and forming an amideimide group containing prepolymer. The polyisocyanate is then added and reacted to form a block amide-imide prepolymer of relatively high molecular weight. It can be cured as by heating to form flexible film or coatings. Alternatively, the carboxylic anhydride and organic diamine can be reacted in equimolar proportions, still providing desirable flexible films or coatings, wire enamels, paints, laminate adhesives and the like.

As taught, for example, in U.S. Pat. No. 3,817,926, up to 75 mole percent of the carboxylic anhydride can be replaced by substituted or unsubstituted aliphatic anhydride or diacid such as oxalic, maleic, succinic, glutaric, adipic, pimelic, suberic, azelaic, sebacic and dodecanedioic as well as unsaturated materials including maleic and fumaric materials, among others. Such acids can be expressed by the formula

HOOC—R'—COOH      IV where R' is a divalent saturated or unsaturated aliphatic group or one containing a carbon-to-carbon double bond and having from about one to 40 carbon atoms, while the anhydrides can be expressed by

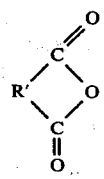

The normal organic solvents used for such materials include cresols or cresylic acid, phenol, xylene, N-methylpyrrolidone, dimethylformamide, dimethyl sulfoxide, dimethylacetamide, and the like which not only tend to pollute the atmosphere during the curing process, but which in some instances are toxic, flammable or may cause serious chemical burns.

The above exemplary preparation method for polyamideimides is just that, and there are taught in the above patents and the voluminous general literature in this art including but not limited to *New Linear Polymers*, Lee et al, McGraw-Hill, 1967, all of such teachings, where applicable, being included by reference herein.

In addition to avoiding costly organic solvents which are presently used in connection with polyamideimide coating compositions, it would be most desirable to use a solvent such as water which would not only be cheaper but would be more acceptable ecologically.

Those features of the invention which are believed to be novel are set forth with particularity in the claims appended hereto. The invention will, however, be better understood and further advantages and objects thereof appreciated from a consideration of the following description.

Broadly speaking, in the practice of the present invention, the polyamideimide such as the powdered solid is mixed with a secondary or tertiary amine or mixtures along with water as a solvent to which there may be added relatively small amounts of organic solvent in certain instances, the mixture being heated to a temperature of about 80° C. until a clear solution is obtained. Primary amines can also be used but are generally not reactive enough for an economic process. During the process the amine splits the imide ring of the polyamideimide.

The amines or amine group containing materials useful in connection with the present invention are preferably tertiary amines and include, among others, dimethylethanolamine, triethanolamine, phenylmethylethanolamine, butyldiethanolamine, phenyldiethanolamine, phenylethylethanolamine, methyldiethanolamines, and triethylamine. Secondary amines are also useful. The present coating compositions may be made in a wide range of solids contents to suit any particular application consistant with coating ease and capability. Generally, the solids content can range from about 10 percent to 40 percent by weight solids or even more from a practical point of view.

Polyamideimides which have up to about 20 percent free carboxyl groups can be used. However, free carboxyl groups are not essential to the invention.

The following examples illustrate the practice of the present invention, it being understood that they are exemplary only. All parts are by weight unless otherwise indicated.

EXAMPLE 1

Ten parts of commercial polyamideimide powder, specifically Amoco AI-10 was combined with 35 parts of water, 5 parts of N-methylpyrrolidone and 10 parts of the tertiary amine dimethylethanolamine. The mixture was heated to 80° C. until a clear amber color solution was obtained. A portion of the liquid was coated on a metal panel, the coating being cured for one hour at 200° C. The panel was bent 180° without cracking. Another panel so coated was cured at 175° C. for 30 minutes and at 200° C. for 15 minutes to give a clear, flexible film.

EXAMPLE 2

Twenty-five parts by weight of polyamideimide powder were combined with 60 parts of water, 15 parts of N-methylpyrrolidone and 23 parts of dimethylethanolamine. The mixture was placed on a roller for mixing and heated to 80° C. until a clear solution was obtained. This material was coated on a metal panel and cured for one hour at 135° C. and then at 240° C. for 15 minutes. A clear, flexible film was obtained which did not crack when the panel was doubled upon itself.

EXAMPLE 3

A mixture of 397 parts of 33 percent by weight solids solution of polyamideimide and N-methylpyrrolidone was heated to 150° C. and 112 parts of dimethylethanolamine added thereto. The contents were cooled to 100° C. and 487 parts of water added. The resulting solution was clear and had a solids content of 25.3 percent with a viscosity of 1,430 centistokes at 25° C. This wire enamel solution was applied to 18 AWG copper wire using seven passes to produce a 3.0 mil film buildup. The enamel was cured in a 15 foot high gas-fired oven, the running speed being 50 ft. per minutes with a top oven temperature of 480° C. and a bottom temperature of 270° C. The resulting magnet wire had a cut-through of 325° C. and otherwise acceptable characteristics.

EXAMPLE 4

A 33 percent solution of polyamideimide in the amount of 397 parts was heated to 150° C. and 50 parts of di-N-butylamine added thereto. The contents were stirred and allowed to cool to 100° C. and 107 parts of water were added. The resulting clear solution had a solids content of 27.1 percent and a viscosity of Z-5. When this material was cured on aluminum at 100° C. for 10 minutes and 160° C. for 10 minutes and finally at 200° C. for 30 minutes, the resulting film was clear and did not fail during a 90° crease.

EXAMPLE 5

A container was charged with 10 parts of polyamideimide powder, there being added thereto 13.5 parts of dimethylethanolamine and 76.5 parts of water. The material was heated to 90° C. with stirring to give a clear, viscous solution. When a portion of the above solution was cured on an aluminum substrate for one hour at 200° C., a flexible film was obtained.

There are provided by the present invention polyamideimide base coating compositions which are characterized by good coating characteristics and particularly by their increased cut-through temperature. In addition, such materials are partially or wholly soluble in water, representing a saving in solvent cost as well as being ecologically acceptable. While the materials are particularly useful as magnet wire enamels and as varnishes, they can also be used for preparing laminates of layered materials, composites of fibers, powders, varnishes and the like and for coating purposes in general.

What I claim as new and desire to secure by Letters Patent of the United States is:

1. The process of preparing a soluble cleaved polyamideimide containing coating composition which comprises reacting said polyamideimide with a tertiary amine to cleave at least part of the imide rings in a solvent containing water as a major constituent, said reacting being continued until a clear solution is obtained, wherein the quantity of said tertiary amine is more than sufficient to neutralize any free carboxyl groups present in said polyamideimide.

2. An aqueous polyamideimide coating composition prepared by means of the proces of claim 1.

3. A coating composition as in claim 2 wherein water and said tertiary amine is the sole solvent.

4. A coating composition as in claim 2 in which said cleaved polyamideimide contains essentially no free carboxyl groups.

5. A coating composition as in claim 2 wherein said polyamideimide before being cleaved contains free carboxyl groups.

6. A coating composition as in claim 2 wherein said tertiary amine is dimethylethanolamine.

* * * * *